June 14, 1960   G. A. HAMILTON ET AL   2,940,363
ROCKET RELEASE MECHANISM
Filed July 30, 1957
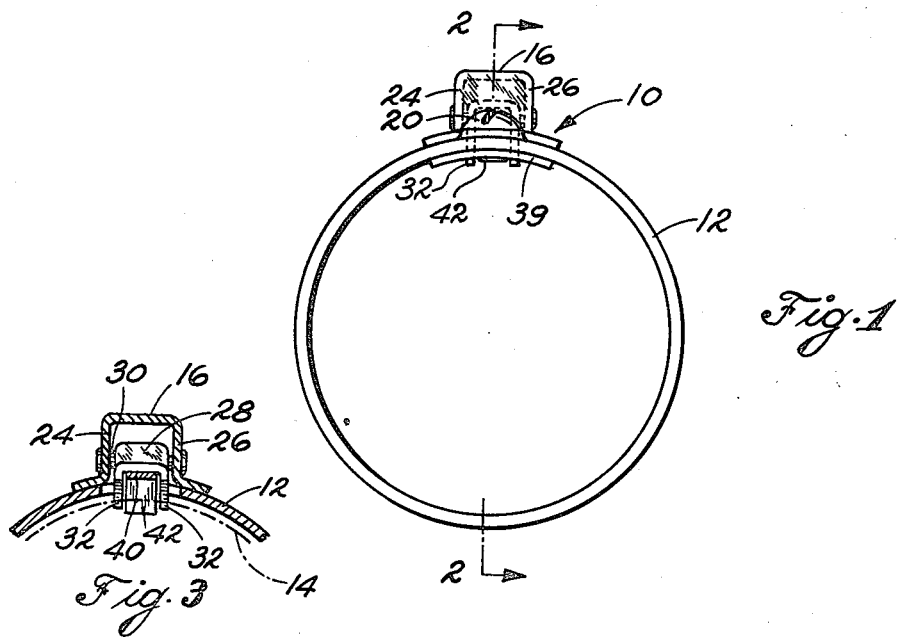
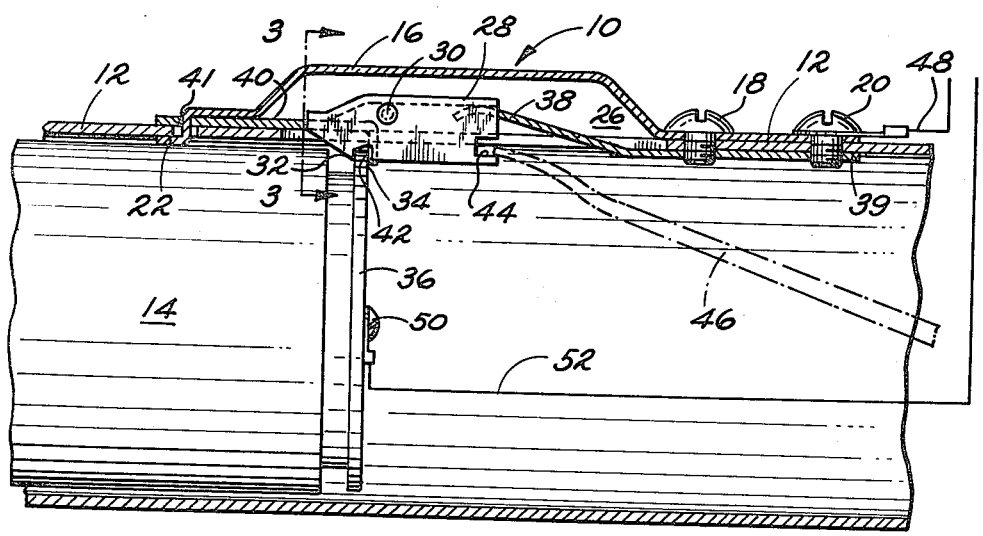
INVENTORS
GEORGE A. HAMILTON
& RALPH T. MARETTE.
BY
RICHEY, WATTS, EDGERTON,
McNENNY & FARRINGTON.
ATTORNEYS

# United States Patent Office 2,940,363
Patented June 14, 1960

2,940,363
ROCKET RELEASE MECHANISM

George A. Hamilton, Cleveland, and Ralph Thomas Marette, Cleveland Heights, Ohio, assignors to The Weatherhead Company, Cleveland, Ohio, a corporation of Ohio Filed July 30, 1957, Ser. No. 675,204

3 Claims. (Cl. 89—1.7)

This invention relates to a rocket release mechanism and more particularly to an apparatus adaptable to automatically latch and secure a rocket into position in a rocket launcher and to automatically release the rocket in response to firing thereof.

Heretofore rocket launchers have included latch means mounted in the wall of the tube carrying the rocket which were constructed and arranged so that an opening was provided in the wall of the tube which resulted in gas flow from a tube being fired going through the opening in the wall of the tube into and damaging other adjacent rocket tubes making up the cluster for the package. According to the present invention, a rocket latch structure is provided which prevents the escape of gas from one rocket tube into and to an adjacent tube of the cluster in an amount sufficient to damage other tubes. According to our invention, a pivoted latch for the rocket is carried by a metal member which houses the latch and at the same time substantially prevents the escape of gas from one tube into another tube by way of the latch opening.

It is a further object of this invention to provide a rocket release mechanism adaptable to automatically latch and secure a rocket inserted into a launcher.

It is a further object of this invention to provide a rocket release mechanism that facilitates electrical conduction between a rocket and an external electrical source for initiating operation of the rocket motor.

Other and further objects and advantages will be made clear from a perusal of the following detailed description of the invention taken with the accompanying drawings in which:

Fig. 1 is an end elevation of the invention embodied in a rocket launcher,

Fig. 2 is a side elevation of the invention taken along section 2—2 of Fig. 1, and Fig. 3 is a fragmentary view taken along section 3—3 of Fig. 2, showing the release mechanism of this invention.

Referring now more particularly to Figure 1 of the drawings, 10 represents generally the rocket release mechanism as applied to a rocket launcher tube 12, and 14 represents a rocket positioned within tube 12 preparatory to transport and firing. Rocket release mechanism 10 is disposed near the rear end of the rocket and includes a cover-base 16 fastened to tube 12 by a pair of axially spaced screws 18 and 20 at one end thereof and interlocking tube 12 by means of a tongue 22 at the other end thereof. Intermediate its ends, cover-base 16 is concaved to receive other components of the release mechanism and is provided with a pair of opposed, parallel side walls 24 and 26, as shown clearly in Figure 1.

For selectively securing a rocket within the launcher tube, latch 28 is mounted on a pivot 30 so as to permit a rocking movement of the latch. Latch 28 is of inverted U-shape, as seen in Fig. 3 of the drawing, to partially enclose a stop member to be described and is provided with an oblique or slant face 32 at a forward end thereof and a recess 34 immediately adjacent and rearwardly of face 32. Face 32 is adaptable to bear against the after end of a rocket to pivot the latch in a clockwise direction as viewed in Figure 2 and recess 34 is adaptable to receive a ring 36 of rocket 14 after the same has been inserted into the launcher sufficiently to permit latch 28 to pivot in a counter-clockwise direction after having been displaced in a clockwise direction by the ring 36.

For maintaining latch 28 in an engaging position, leaf spring 38 is provided for urging latch 28 into a counter-clockwise movement as viewed in Fig. 2. A first end 39 of the spring is secured to tube 12, preferably by screws 18 and 20 and the other end is preferably curved to bear regularly against the lower side of a flange surface of latch 28 as viewed in Fig. 2. Spring 38 provides a light torsional force to latch 28 to assure the return thereof subsequent to rotation imparted by rocket 14 against face 32.

A "stop" member 40 is rigidly retained between tube 12 and cover base 16 by tongue 22 extending through a slot 41 near one end of the "stop" and is provided with a shoulder 42 perpendicular to the body of the stop. As shown more clearly in Fig. 3 of the drawings, in an extreme counterclockwise position, latch 28 partially surrounds and is engageable with "stop" 40 to limit the pivotal movement of the latch and shoulder 42 of "stop" 40 is effective to suitably limit the rearward movement of rocket 14.

For permitting manual unlatching of the rocket, latch 28 is provided with a notch 44 at the rear end thereof which is manually engageable by a suitable tool 46 as shown in Fig. 2 of the drawings, for pivoting latch 28 to release a rocket or for other purposes should the occasion so require. Tool 46, which may be a screw driver, is inserted into the launcher from the rearward end and into the notch 44 and is then forced downwardly whereby latch 28 is pivoted in a clockwise direction as viewed in Fig. 2 to effect the rocket release.

In the operation of a rocket launcher incorporating this invention, a rocket is inserted into the launcher from the left hand side as viewed in Fig. 2 with the rear end of the rocket leading. Latch 28 is in position as shown since a flange thereof is in engagement with "stop" member 40 to limit counterclockwise rotation thereof. The ring 36 at the rear end of the rocket engages face 32 and continued rearward movement of the rocket rotates latch 32 in a clockwise direction, as viewed in Figure 2, sufficiently to cause it to rise above ring 36. Shoulder 42 of "stop" member 40 limits the rearward movement of the rocket and latch 28 pivots in a counter-clockwise direction to receive a portion of ring 36 in recess 34. Accordingly, by virtue of continued engagement of latch 28 with ring 36, assured by engagement of leaf spring 38 with the latch, rocket 14 is positionally secured in the launcher against forward or rearward movement.

For facilitating firing of rocket 14, an electrical circuit is provided through the rocket release mechanism and rocket itself and including a lead wire 48 secured to screw 20, leaf spring 38, latch 28, ring 36, rocket 14, and terminal contact 50 on the rear end of rocket 14 and a return lead wire 52. Suitable electrical components including an electrical source and switch (not shown) are provided for selectively producing an electrical current flow through the circuit by the control of the pilot of the aircraft to which the launcher is attached. Such current is effective to fire the rocket and upon firing, the forward thrust of the rocket against latch 38 is effective to impart a clockwise and consequently unlatching motion to latch 28 whereby the rocket is automatically released and discharged from the launcher.

It will be understood from the foregoing that the cover base 16 is provided with flanges at each side conforming to the curvature of the fiber tube 12 (as shown in Fig. 3) and that longitudinal flanges on the base cover 16 overhang the opening to the wall of the fiber tube 12. This construction results in an arrangement which effectively prevents gas escaping from one rocket tube through the passageway in the wall around the pivoted latch and moving into an adjacent tube of the cluster. It will also be noted that the cover base member 16, in addition to housing and supporting the latch and preventing the escape of the gas through the wall of the tube, interlocks with a member 40 which serves as a stop for the end of the rocket 14 as the rocket is being advanced into the tube for loading and latching.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

We claim:

1. A rocket launcher mechanism comprising a non-metallic tube to receive a rocket, an elongated opening in the wall of the tube intermediate the ends of the tube and adjacent the end of the rocket to be housed in the tube, a metallic latch housing having a re-entrant central portion and flanges on all sides of the periphery thereof, said flanges being curved to conform to the outer surface of the tube and being mounted on the exterior of the tube to cover said elongated opening, an elongated latch pivoted in said housing and having portions thereof extending into the interior of the tube, one of said last-named portions being forward of the pivot and having a cam face to tilt the latch in response to axial movement of a rocket in said tube, said last-named portion also having a notch to engage the end flange of a rocket moved into the tube, said latch having a portion rearwardly of the pivot within the tube, a leaf spring mounted on the tube at the interior thereof, a portion of said leaf spring bent outwardly to engage said latch rearwardly of the pivot and bias the latch notch at the forward end into engagement with the flange on the rocket, said latch having a transverse notch rearwardly of the pivot to receive a latch release tool.

2. A rocket launcher mechanism comprising a non-metallic tube to receive a rocket, an elongated opening in the wall of the tube intermediate the ends of the tube and adjacent the end of the rocket to be housed in the tube, a metallic latch housing having a re-entrant central portion and integrally formed flanges on all sides of the periphery therof, said flanges being curved to conform to the outer surface of the tube and being mounted on the exterior of the tube to enclose said elongated opening and form a latch chamber, and elongated latch pivoted in said chamber and having portions forwardly and rearwardly of the pivot extending into the interior of the tube, the portion forward of the pivot having a cam face to tilt the latch in response to axial movement of a rocket in said tube, said last-named portion also having a notch to engage the end flange of a rocket moved into the tube, said latch portion rearwardly of the pivot within the tube engaging a leaf spring mounted on the tube at the interior thereof to bias the latch at the forward end into engagement with a flange on the rocket, said latch having a transverse notch rearwardly of the pivot to receive a manually operated latch release tool.

3. A rocket launcher mechanism comprising a non-metallic tube to receive a rocket, an elongated opening in the wall of the tube intermediate the ends of the tube and adjacent the end of the rocket to be housed in the tube, a metallic latch housing having a re-entrant central portion and integral flanges on the periphery thereof, said flanges being curved and flattened to bear against the outer surface of the tube, means to secure the latch housing on the tube to cover said elongated opening, an elongated latch pivoted in the re-entrant portion of said housing and having portions thereof extending into the interior of the tube, one of said last-named portions being forward of the pivot and having a cam face to tilt the latch in response to axial movement of a rocket in said tube, said last-named portion also having a notch at the end of the cam face to engage the end flange of a rocket being moved into the tube, said latch having a portion rearwardly of the pivot within the tube, a leaf spring mounted on the tube at the interior thereof by said means to secure the housing to the tube, a portion of said leaf spring bent outwardly through said opening to engage said latch rearwardly of the pivot and bias the latch at the forward end into engagement with the flange on the rocket.

References Cited in the file of this patent

UNITED STATES PATENTS

| 2,430,636 | Gould | Nov. 11, 1947 |
| 2,460,929 | Goff | Feb. 8, 1949 |
| 2,764,066 | Doak et al. | Sept. 25, 1956 |
| 2,817,272 | Gunder | Dec. 24, 1957 |
| 2,830,497 | Smoot | Apr. 15, 1958 |

FOREIGN PATENTS

| 914,341 | France | June 17, 1946 |
| 1,036,738 | France | Apr. 29, 1953 |
| 1,102,333 | France | May 4, 1955 |